(12) United States Patent
Chen Kaidi

(10) Patent No.: US 11,582,251 B2
(45) Date of Patent: Feb. 14, 2023

(54) IDENTIFYING PATTERNS IN COMPUTING ATTACKS THROUGH AN AUTOMATED TRAFFIC VARIANCE FINDER

(71) Applicant: PayPal, Inc., San Jose, CA (US)

(72) Inventor: George Chen Kaidi, Singapore (SG)

(73) Assignee: PAYPAL, INC., San Jose, CA (US)

( * ) Notice: Subject to any disclaimer, the term of this patent is extended or adjusted under 35 U.S.C. 154(b) by 444 days.

(21) Appl. No.: 16/883,828

(22) Filed: May 26, 2020

(65) Prior Publication Data

US 2021/0377288 A1 Dec. 2, 2021

(51) Int. Cl.
*H04L 29/06* (2006.01)
*G06N 20/00* (2019.01)
*G06N 5/04* (2006.01)
*H04L 9/40* (2022.01)

(52) U.S. Cl.
CPC .......... *H04L 63/1425* (2013.01); *G06N 5/04* (2013.01); *G06N 20/00* (2019.01); *H04L 63/1416* (2013.01)

(58) Field of Classification Search
CPC . H04L 63/1416; H04L 63/1425; G06N 20/00; G06N 5/04
See application file for complete search history.

(56) References Cited

U.S. PATENT DOCUMENTS

| | | | | |
|---|---|---|---|---|
| 7,203,962 B1 * | 4/2007 | Moran | ............... | G06F 21/52 726/25 |
| 10,129,288 B1 * | 11/2018 | Xie | ............... | H04L 63/1425 |
| 10,326,778 B2 * | 6/2019 | Gong | ............... | H04L 63/1425 |
| 10,733,514 B1 * | 8/2020 | Savir | ............... | G06F 11/3006 |
| 11,436,647 B1 * | 9/2022 | Null | ............... | G06N 20/00 |
| 2015/0262077 A1 * | 9/2015 | White | ............... | G06N 20/00 706/12 |
| 2016/0366159 A1 * | 12/2016 | Chiba | ............... | H04L 63/1458 |
| 2019/0331813 A1 * | 10/2019 | Zhang | ............... | G06F 17/16 |
| 2021/0117868 A1 * | 4/2021 | Sriharsha | ............... | G06F 16/901 |
| 2021/0306354 A1 * | 9/2021 | Raghuramu | ............... | H04L 67/535 |

FOREIGN PATENT DOCUMENTS

| | | | | |
|---|---|---|---|---|
| EP | 3262815 B1 | * 10/2020 | ......... | G06F 21/6218 |
| JP | 2004318552 A | * 11/2004 | ......... | H04L 63/1425 |

OTHER PUBLICATIONS

English language translation of Japanese Patent JP-2004318552-A (18 pages) (Year: 2004).*

* cited by examiner

*Primary Examiner* — Joseph P Hirl
*Assistant Examiner* — Thomas A Gyorfi
(74) *Attorney, Agent, or Firm* — Haynes and Boone, LLP

(57) ABSTRACT

There are provided systems and methods for identifying patterns in computing attacks through an automated traffic variance finder. A service provider, such as an electronic transaction processor for digital transactions, may determine network traffic logs caused or generated by malicious web traffic and network communications, such as during a computing attack by a bad actor. The service provider may generate a log signature for the network traffic log based on a variance or uniqueness of the network traffic logs IP address from other network traffic logs for each field in the network traffic log over a time period, and a spread in the commonality of the network traffic log with other network traffic logs. An aggregate score for each field may be determined based on the variance and the spread. Once determined, the log signature may be used to identify other network traffic logs through a search function.

20 Claims, 6 Drawing Sheets

Heat Map 1000

| Fields 1002 | User Agent | Src | Src port | Method | Account ID | Status | Uripath | Destination |
|---|---|---|---|---|---|---|---|---|
| Variances 1004 | 99.75% | 86.20% | 84.05% | 75.10% | 60.90% | 36.65% | 29.80% | 20.00% |
| Spreads 1006 | 5.00% | 7.00% | 10.00% | 50.00% | 38.00% | 20.00% | 15.00% | 12.00% |
| Aggregates 1008 | 98.325% | 88.24% | 85.835% | 67.57% | 61.23% | 48.955% | 46.36% | 40.40% |

IDENTIFYING PATTERNS IN COMPUTING ATTACKS THROUGH AN AUTOMATED TRAFFIC VARIANCE FINDER

TECHNICAL FIELD

The present application generally relates to detecting computing attack patterns based on similarities to malicious network traffic logs and more particularly to generating a log signature that identifies the malicious network traffic log to allow for searching and identification of other network traffic logs from the same attacker or other attackers.

BACKGROUND

Online service providers may provide services to different users, such as individual end users, merchants, companies, and other entities. When providing these services, the service providers may provide an online platform that may be accessible over a network. Thus, users may utilize a computing device to access and utilize different processes, operations, applications, and platforms of the service provider available over the network, as well as request processing of data. However, as hackers and other malicious users or entities become more sophisticated, they may perform different computing attacks and other malicious conduct with the service provider, such as fraudulent electronic transaction processing. Service providers may identify certain attacks but may be unaware of the scale and specific computing endpoints performing the attacks to quickly detect and deflect such computing attacks. By identifying the sources of the computing attacks and the frequency or scale of the attacks, service providers may reduce risk, fraud, potential damage to the service provider's computing platforms, and/or exposure of data.

BRIEF DESCRIPTION OF THE DRAWINGS

FIG. 2 is an exemplary block diagram of a heatmap showing different aggregates calculated for different log fields to generate a log signature of a malicious network traffic log, according to an embodiment;

Figure 1:
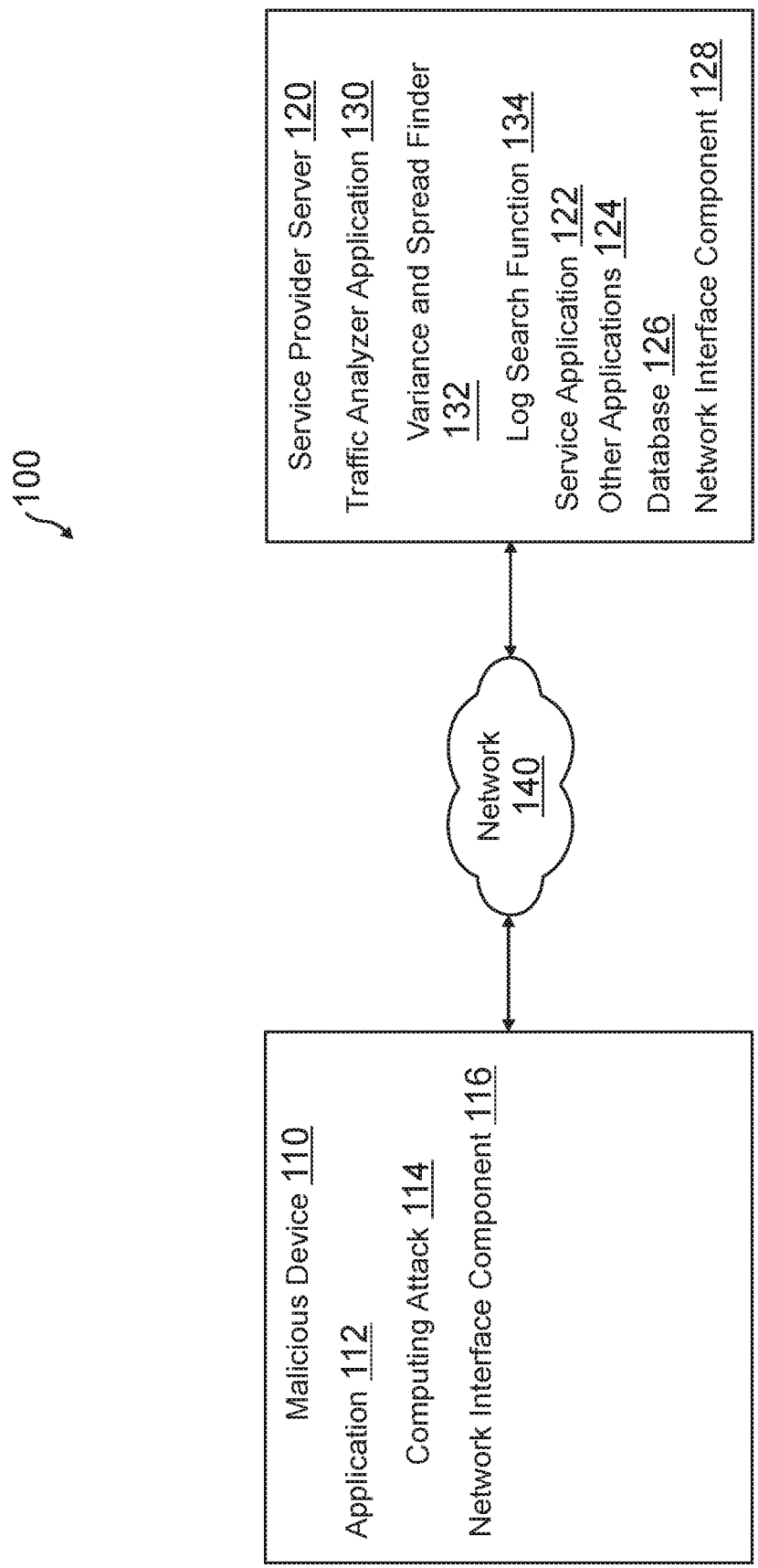
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for identifying patterns in computing attacks through an automated traffic variance finder. Systems suitable for practicing methods of the present disclosure are also provided.

In service provider systems, such as online platforms and systems that allow users to interact with, use, and request data processing, their computing architecture may face different types of computing attacks coming from malicious sources over a network. For example, some bad actor may initiate a computing attack on the computing environment of the service provider, such as an HTTP smuggling request, denial-of-service (DoS) and distributed denial-of-service (DDoS) attacks, a fraudulent transaction processing request, a password attack, a web abuse (e.g., account enumeration, bruteforce attacks, SQL injection), or other type of computing attack. This computing attack may introduce risk to resources of the service provider, secure and sensitive data, and/or fraud and loss by the service provider. In order to identify, remedy, stop, and/or prevent these computing attacks and other abuses of the service providers, the service providers may determine the patterns of the computing attacks, the sources of the computing attacks, the frequency and scale of the computing attacks, and any similar types of attacks. For example, a service provider may determine a malicious network traffic log that was identified as initiating and performing the particular attack against the service provider. A log signature or pseudo-signature may be generated based on a variance of the IP address for the log over a time period and a spread of similar logs over the time period. Once generated, this log signature allows for searching of other logs coming from the same source and/or similar logs from other sources. This allows the service provider to identify the extent and sources of the computing attack.

For example, a service provider, which may provide services to users including electronic transaction processing such as online transaction processors (e.g., PayPal®), may allow merchants, users, and other entities to process transactions, provide payments, and/or transfer funds between these users. The user may also interact with the service provider to establish an account and provide other information for the user. Other service providers may also provide computing services, including social networking, microblogging, media sharing, messaging, business and consumer platforms, etc. In order to utilize the computing services of a service provider, the service provider may provide a computing architecture and environment where the users may access and utilize operations provided by the service provider. However, malicious end users and/or computing devices (e.g., computing devices that may include malware, viruses, and the like that may be hijacked to automate computing attacks) may attempt to abuse the service provider's systems through computing attacks.

To address this, in one embodiment, the service provider may first identify and determine a malicious network traffic log, such as a network traffic log coming through web traffic to a particular domain or platform of the service provider. The traffic log may correspond to an entry that includes different data fields or attributes, such as a firewall log from web traffic. For example, different traffic logs may include fields or attributes, such as user agent string, source (e.g., a source IP address), source port, method, account number, status, uniform resource identifier (uri)_path, destination, destination port, bytes out, bytes in, etc. Other potential log fields may include country, city, uniform resource locator (url), duration, request_length, url_query, ASN (autonomous system number), email, language, cdn_region, referrer, isp_network, content_type, event_type, application, domain, filename, signature, category, number_of_packets, threat, access_token, user, connection_status, protocol, browser_ type, device_type, action, is_ip_proxy, response_code, time_intervals_waf_rules, threat, category, content_length, x-forwarded-for_port, headers, account_number, visitor_id, api_name, ssl_cipher, timeout. Each of these fields may correspond to different data within the field. For example, a user agent string field's data may read: "randomBlobOfText 2.0", a source IP address field's data may be 1.2.3.4, and/or a source port's data may be 56789.

Once the malicious network traffic log is determined, the service provider may then determine other network traffic logs received during a time period by the service provider, including from the domain of the malicious log or another domain. For example, the service provider may select a one-hour time period where the service provider may determine and collect all other network traffic logs or a subset of the network traffic logs (e.g., taken through sampling all logs detected over that time period). The logs and/or time period may be selected based on the service provider identifying other computing attacks during that time period, to identify an extent and/or source of the computing attack during the time period, and/or based on minimum or maximum number of logs for generating the malicious log's signature and testing for computing attacks. For example, the network traffic logs selected for the signature over a one-hour period may correspond to five million log entries.

Thereafter, the service provider may determine a variance value, score, or percentage for each field of the malicious network traffic log over the time period. A variance may correspond to a distinction of the malicious log's IP address when compared to the IP addresses associated with all of the other traffic logs from the time period. To determine a variance, the service provider may first determine log data within a particular field of the malicious network traffic log, such as the user agent string field. The service provider may then examine all of the other network traffic logs over the time period and determine, from those network traffic logs, which include the same or similar data within that data field (e.g., the user agent string field). After determining this subset of network traffic logs from all of the network traffic logs from the time period, the service provider may then determine how many IP addresses are associated with the subset of the network traffic logs. Thus, the service provider examines all of the network traffic logs from the time period to determine corresponding network traffic logs that share the same or similar log data within a particular log field.

For example, for the malicious log's user agent string field, the data may be "randomBlobOfText 2.0". In the above example where five million network traffic logs were created and/or received by the service provider over a one-hour time period, the service provider's network traffic log may then examine the five million network traffic logs that are associated with the one-hour time period. The service provider's network traffic log analyzer may then determine, from the network traffic logs over the time period, a number of IP addresses that had "randomBlobOfText 2.0" in their network traffic logs' user agent string field. In an exemplary scenario, 1 out of 400 IP addresses for the five million logs over the time period may have the matching user agent string's data or value. This may then be determined to be a variance of 399 of 400, or 99.75% variant from the IP addresses over the time period. The service provider may perform this calculation for each data field and the corresponding data within the malicious network traffic log to get a set of variance values, scores, or percentages (with one variance value corresponding to each data field).

The service provider's network traffic log analyzer may then determine a spread for each of the malicious network traffic log's data fields and their corresponding data. In a similar manner to the variance, the log analyzer may select a data field and read or determine the corresponding data in the data field (e.g., "randomBlobOfText 2.0" for a user agent string). For the particular field, the log analyzer may then determine a spread or composition of all the network traffic logs when compared to all of the other network traffic logs from the time period. To determine spread, the service provider may first determine log data within a particular field of the malicious network traffic log, such as the user agent string field. The service provider may then examine all of the other network traffic logs over the time period and determine, from those network traffic logs, which include the same or similar data within that data field (e.g., the user agent string field). Thus, the service provider examines all of the network traffic logs from the time period to determine corresponding network traffic logs that share the same or similar log data within a particular log field. In the exemplary scenario, 250 k of the five million logs may share the "randomBlobOfText 2.0" for the user agent string field. This may correspond to 250 k of 5 million, or 5.00% spread or composition of the field's data over the log entries. The service provider may perform this calculation for each data field and the corresponding data within the malicious network traffic log to get a set of spread values, scores, or percentages (with one spread value corresponding to each data field).

Thereafter to generate the malicious network traffic log's signature or pseudo-signature, the service provider's network traffic log analyzer may generate aggregate values or aggregations of the variance values and the spread values for each data field. This may be generated by determining a weighted average of the variance and the spread for a particular field or attribute. The spread may also be adjusted to determine a spread of other log entries not having the particular data field's data. For example, the weighted average may correspond to a 0.7 or 70% weight for the variance and a 0.3 or 30% weight for the spread, such as where the variance may be weighted higher. However, other weights may be set by the service provider, an administrator, tester, or developer as desired to generate a particular log signature. In the exemplary scenario, using the 70/30% weight of the variance and spread, respectively for the user agent string's variance value and spread value, the aggregate may correspond to 75%*70%+(100−5)%*30%=98.325%. The service provider may perform this calculation for each data field and the corresponding variance and spread values for the malicious network traffic log to get a set of aggregate values, scores, or percentages (with one aggregate value corresponding to each data field).

Further, in some embodiments, malicious network traffic logs and/or their calculated field variances, spreads, and/or aggregated may be utilized as training data to train a machine learning model used to adjust the weights for calculating the aggregate values and generating the log signatures. A feedback mechanism may be used to adjust the weights and/or machine learning model. For example, an administrator, security analyst, or developer may determine when the weights for determining the aggregate values provide a better or worse log signature that may be used to detecting other malicious network traffic logs. The feedback mechanism may then be used to adjust the machine learning model and/or aggregate weight values to more closely fit the training data. For example, based on past identified patterns that are verified to be malicious, if certain attributes and/or data fields (e.g., user-agent string), are often used in the signature/pattern, those attributes may be provided a higher weightage that is dynamically computed by the machine learning model. Thus, the service provider's log analyzer first identifies which data sources carry the particular traffic or field data being analyzed, and then performs a comparison to other traffic logs.

Thereafter, the malicious network traffic log's signature may be generated using the aggregates, such as by creating a table, view, visualization, or searchable content having the variances, the spreads, and the aggregates for each data field of the malicious network traffic log. Thus, this allows a deeper view of the malicious or questionable logs. In some embodiments, this may also be done for randomly sampled logs in order to detect the similarity of those logs to other logs, which may be required if a particular network traffic log is causing an error or to check various statistics and extent of certain traffic logs. This may include where a merchant, user, or other entity utilizing the service provider may be encountering particular issues or other requirements to track a particular log and check for errors.

Further, once the values for variances, spreads, and aggregates are calculated, the network traffic log analyzer may generate a table or tabular view of the data within each data field. This may be done by arranging columns of the malicious log's data fields in a table and having rows corresponding to the field/attribute, the variance, the spread, and the aggregate, or vice versa. For example, a horizontally sorted table allows for viewing a heatmap or other visualization of the data. This may include a colorization that allows for visualizing the data fields aggregates and the components that cause the particular signature. Further, the aggregates may be ranked in an ascending or descending order based on their values so that certain fields or attributes may be grouped, such as a top three, top four, or other group of fields.

Thereafter, the service provider may perform a search using the malicious network traffic log's signature. For example, in a first type of search, the service provider may detect other network traffic logs from the same source. In this regard, the service provider's search function for the network traffic log analyzer may select the top three fields, or other top number of fields, and may execute a search of other network traffic logs. To perform the search of the other network traffic logs, the log data within the top three fields of the malicious network traffic log is determined, and the service provider searches the other network traffic logs for traffic logs that have the same or similar data in those data fields. For example, in the malicious network traffic log the top three fields having the highest aggregate values or scores may be the user agent string field, the source IP address field, and the source port field. For the malicious network traffic log, the user agent string field's data may read: "randomBlobOfText 2.0", the source IP address field's data may be 1.2.3.4, and the source port field's data may be 8765. Thus, a search may be executed to find other network traffic logs that include the same log data within these three fields. By requiring the same or similar data or values from the top three (or other number) of data fields of the malicious network traffic log, the service provider may identify logs that have an increased or higher likelihood of originating from the same source (e.g., the malicious source). Thus, the service provider may identify the extent of the abuse for the malicious source.

Further, the service provider may provide additional search functions to find similar network traffic logs to the malicious network traffic log that may have come from other sources, thereby identifying the other sources and determining the extent, frequency, and amount of the computing attack against the service provider. The search may select a top four fields, or other set of fields over a threshold (e.g., with an aggregate score over 65% for example, or another threshold value). The search may then identify other network traffic log signatures for the other network traffic logs that share these same fields having aggregate values over the threshold. In this regard, the service provider's network traffic log analyzer may similarly determine log signatures having aggregates for the other network traffic logs from the selected time period. Determination of the log signatures from other network traffic logs may occur in real-time as network traffic logs are created and/or received through a particular system or domain. This may occur when the service provider is monitoring incoming network or web traffic to identify computing attacks and other malicious actions by bad actors. Further, when creating log signature in real-time for incoming traffic, the service provider may also perform sampling to reduce the number of log signatures that are determined, which may affect and reduce processing load on the service provider.

In an exemplary scenario, the top four fields may correspond to a user agent string, source IP address, source port, and method. Therefore, the search may identify other network traffic logs from the time period that have these same four fields having their calculated aggregates from their log signatures also over the threshold (e.g., 65%). An exemplary search may appear as: "where aggregate user agent string >65% AND aggregate source >65% AND aggregate source port >65% AND aggregate method >65%." This may also include an AND aggregate X<=65% to remove other fields not considered. This may identify the other sources of the same or similar computing attack, as well as an extent of the abuse from the different sources. This does not require exact matching field but instead uses the aggregated values for comparison.

In some embodiments, sampling may be done to reduce processing load and runtimes for calculating the log signatures for other network traffic logs. For example, sampling may be done on the five million entries to select ten thousand, or other subset of all of the logs from the time period. This may also be done as log signatures are determined in real-time and/or continuously for a particular domain. However, sampling may be unnecessary where a short time period is selected, or the operation is performed ad hoc as runtime and log size/number may be smaller or unimportant. Further, two or more logs from different domains, sources, or platforms may be combined to perform log enrichment and detect computing attacks that may occur in multiple different environments. Once a pattern is identified, the service provider may implement certain rules or policies based on the particular malicious network traffic logs. For example, the service provider may bar certain network traffic logs and/or associated IP addresses when those traffic logs are detected as being similar to or sharing field data with the malicious network traffic log.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, standalone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity.

System 100 includes a malicious device 110 and a service provider server 120 in communication over a network 140. Malicious device 110 may be utilized by a malicious user or other bad actor to perform some computing attack over network 140, where service provider server 120 may provide various data, operations, and other functions over network 140. In this regard, malicious device 110 may direct the computing device against the systems of service provider server 120, which may adversely impact services provided by or content accessible through service provider server 120. Service provider server 120 may detect the computing attack and may utilize one or more operations to analyze network traffic to determine other computing attacks and traffic logs from malicious device 110, as well as similar computing attacks from other sources.

Malicious device 110 and service provider server 120 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 140.

Malicious device 110 may be implemented as a communication device that may utilize appropriate hardware and software configured for wired and/or wireless communication with service provider server 120. For example, in one embodiment, malicious device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one device is shown, a plurality of devices may function similarly and/or be connected to provide the functionalities described herein.

Malicious device 110 of FIG. 1 contains an application 112, a database, and a network interface component 116. Application 112 may correspond to executable processes, procedures, and/or applications with associated hardware. In other embodiments, malicious device 110 may include additional or different modules having specialized hardware and/or software as required.

Application 112 may correspond to one or more processes to execute software modules and associated components of malicious device 110 to provide features, services, and other operations for a user over network 140, which may include accessing and/or interacting with service provider server 140. In this regard, application 112 may correspond to specialized software utilized by a user of malicious device 110 that may be used to access a website or UI provided by service provider server 120 to perform actions or operations. In various embodiments, application 112 may correspond to a general browser application configured to retrieve, present, and communicate information over the Internet (e.g., utilize resources on the World Wide Web) or a private network. For example, application 112 may provide a web browser, which may send and receive information over network 140, including retrieving website information (e.g., a website for a merchant), presenting the website information to the user, and/or communicating information to the website. However, in other embodiments, payment application 112 may include a dedicated application of service provider server 120 or other entity (e.g., a merchant). Application 112 may be associated with account information, user financial information, and/or transaction histories. However, in further embodiments, different services may be provided via application 112, including messaging, social networking, media posting or sharing, microblogging, data browsing and searching, online shopping, and other services available through service provider server 120. Thus, application 112 may also correspond to different service applications and the like.

However, when using application 112, the bad actor may execute a computing attack 114 to perform some operation to compromise service provider server 120 and/or conduct fraud. For example, computing attack 114 may attempt to discover secret or sensitive information, takeover an account, request fraudulent electronic transaction processing, or otherwise perform an illegal action or conduct that is barred by the rules and regulations of service provider server. In some embodiments, computing attack 114 may correspond to a HTTP smuggling request, denial-of-service (DoS) and distributed denial-of-service (DDoS) attacks, a fraudulent transaction processing request, a password or eavesdropping attack, a session hijacking or Man-in-the-middle (MitM) attack, or other type of computing attack. During computing attack 114, network traffic logs may be generated based on web traffic and network communications between malicious device 110 and service provider server 120, which may be analyzed by service provider server 120. Thus, application 112 may provide data for different fields and/or attributes within the network traffic, which may be analyzed by service provider server 120 for detection of patterns and log signatures that identify malicious device 110 and computing attack 114.

Malicious device 110 may further include a database stored on a transitory and/or non-transitory memory of malicious device 110, which may store various applications and data and be utilized during execution of various modules of malicious device 110. The database may include, for example, identifiers such as operating system registry entries, cookies associated with application 112 and/or other applications, identifiers associated with hardware of malicious device 110, or other appropriate identifiers, such as identifiers used for payment/user/device authentication or identification, which may be communicated as identifying the user/malicious device 110 to service provider server 120. Moreover, the database may store operations and data associated with computing attack 114. The database may also store log data, which may be utilized during web traffic and network communications and may be found within network traffic logs.

Malicious device 110 includes at least one network interface component 116 adapted to communicate with service provider server 120. In various embodiments, network interface component 116 may include a DSL (e.g., Digital Subscriber Line) modem, a PSTN (Public Switched Telephone Network) modem, an Ethernet device, a broadband device, a satellite device and/or various other types of wired and/or wireless network communication devices including WiFi, microwave, radio frequency, infrared, Bluetooth, and near field communication devices.

Service provider server 120 may be maintained, for example, by an online service provider, which may provide operations for detection of computing attacks from different sources by comparison of network traffic logs and identification of patterns in network traffic log signatures. In this regard, service provider server 120 includes one or more processing applications which may be configured to interact with malicious device 110 to determine a log signature for malicious or harmful network traffic logs from malicious device 110, which may be used to identify patterns in computing attacks. In one example, service provider server 120 may be provided by PAYPAL®, Inc. of San Jose, Calif., USA. However, in other embodiments, service provider server 120 may be maintained by or include another type of service provider.

Service provider server 120 of FIG. 1 includes a traffic analyzer application 130, a service application 122, other applications 124, a database 126, and a network interface component 128. Traffic analyzer application 130 and other applications 124 may correspond to executable processes, procedures, and/or applications with associated hardware. In other embodiments, service provider server 120 may include additional or different modules having specialized hardware and/or software as required.

Traffic analyzer application 130 may correspond to one or more processes to execute modules and associated specialized hardware of service provider server 120 to provide a framework to detect and protect against computing attacks by identifying patterns in computing attacks through analysis of network traffic log signatures. In this regard, traffic analyzer application 130 may correspond to specialized hardware and/or software used by service provider server 120 to first determine one or more network traffic logs corresponding to some malicious behavior, such as computing attack 114 perform by malicious device 110. The malicious network traffic log may correspond to an attempt to compromise the security and/or data of service provider server 120, execute some fraudulent action, or otherwise preform an illegal or illicit computing action, such as an account takeover, session hijacking, and the like. Within the malicious network traffic log, different fields or attributes may include different data corresponding to the particular traffic log, computing device (e.g., malicious device 110), and/or data communications.

For example, a firewall network traffic log may include fields or attributes for a user agent string, source IP address, source port, method, account number, status, uniform resource identifier (uri)_path, destination, destination port, bytes out, bytes in, etc. Within each field, data or values for the particular field may be found, which may correspond to the particular network traffic log. For example, from computing attack 114 by malicious device 110, a user agent string field's data may read: "randomBlobOfText 2.0", a source (e.g., source IP address) field's data may be 1.2.3.4, and/or a source port's data may be 8765. Other potential log fields may include country, city, uniform resource locator (url), duration, request_length, url_query, ASN (autonomous system number), email, language, cdn_region, referrer, isp_network, content_type, event_type, application, domain, filename, signature, category, number_of_packets, threat, access_token, user, connection_status, protocol, browser_type, device_type, action, is_ip_proxy, response_code, time_intervals_waf_rules, threat, category, content_length, x-forwarded-for_port, headers, account_number, visitor_id, api_name, ssl_cipher, timeout.

Thereafter, traffic analyzer application 130 executes a variance and spread finder 132 to generate a log signature or a "pseudo-signature" for the malicious network traffic log entry, which allows for identification of patterns in network traffic logs and detection of other malicious behavior and computing attacks. Variance and spread finder 132 may first select or receive a designation of a set of network traffic logs received over a time period, such all of the network traffic logs received over a one-hour time period. Variance and spread finder 132 may then operate to calculate a variance of the IP addresses over the time period and a spread of the network traffic logs. First, variance and spread finder 132 examines a totality of the selected network traffic logs over the time period. Variance and spread finder 132 then determines a subset of the selected set of network traffic logs that have the same or similar log data in each data field over the time period. Thereafter, to determine the variance, the service provider may identify a number of IP addresses that corresponding to the subset of the selected set of the network traffic logs, and then determine a ratio or percentage of IP addresses that are different than the malicious network traffic log's IP address. Further, variance and spread finder 132 may calculate a spread of the subset of all of the selected set of network traffic logs by determining a ratio or percentage of the subset of network traffic logs compared to the selected set of network traffic logs. Once these are determined, variance and spread finder 132 may determine an aggregate for the particular field or attributed based on a weighted average of the variance and the spread.

Thereafter, traffic analyzer application 130 may provide a log signature for the malicious network traffic log based on the variance, spread, and aggregate calculated for each log field or attribute in the malicious network traffic log. This log signature may be output in a tabular or graphical form for visualization. This may include a heatmap having a ranking of log attributes based on their scores or percentages for the different calculated variance values, spread values, and/or aggregate values. Further, a log search function 134 may be utilized to search for similar network traffic logs to identify patterns in malicious behavior, such as an amount of computing attacks, aggressiveness, and/or frequency of such attacks, and/or sources of the attacks. Log search function 134 may be used to identify attacks from the same computing source by searching other network traffic logs using the log data within one or more data fields of the malicious network traffic log. For example, the top three fields having the highest aggregate scores or percentages may be selected and the corresponding log data in those fields may be searched for other network traffic logs. Log search function 134 may also be used to search for network traffic logs from other computing attacks and sources by generating additional network traffic logs and comparing aggregate values. For example, a top four fields or all fields having over a 65% value may be selected and matched to other log signatures having those same four fields also having aggregates over the 65% (or other selected) value. Where necessary, sampling may be used to reduce the number of calculated log signatures over a time period or during real-time analysis of incoming data so that computing resources are conserved and to prevent high processing demands.

Service application 122 may correspond to one or more processes to execute modules and associated specialized hardware of service provider server 120 to perform a service to end users of service provider server 120, such as process a transaction between users or entities. In this regard, service application 122 may correspond to specialized hardware and/or software used by a user associated with malicious device 110 to perform one or more services, which may be compromised due to computing attack 114. Service application 122 may also correspond to messaging, social networking, media posting or sharing, microblogging, data browsing and searching, online shopping, and other services available through service provider server 120.

In various embodiments, service provider server 120 includes other applications 124 as may be desired in particular embodiments to provide features to service provider server 120. For example, other applications 124 may include security applications for implementing server-side security features, programmatic client applications for interfacing with appropriate application programming interfaces (APIs) over network 140, or other types of applications. Other applications 124 may contain software programs, executable by a processor, including a graphical user interface (GUI), configured to provide an interface to the user when accessing service provider server 120, where the user or other users may interact with the GUI to more easily view and communicate information. In various embodiments, other applications 124 may include additional connection and/or communication applications, which may be utilized to communicate information to over network 140.

Additionally, service provider server 120 includes database 126. Database 126 may store various identifiers associated with malicious device 110. Database 126 may also store account data, including payment instruments and authentication credentials, as well as transaction processing histories and data for processed transactions. Database 126 may store financial information or other data generated and stored by other applications 124. This may include data from one or more operations provided by other applications 124, which may also include sensitive data that may be compromised through computing attacks and/or other malicious actions. Database 126 may also network traffic logs that may be analyzed, including malicious network traffic logs and log signatures determined from those malicious network traffic logs. In this regard, search results and other network traffic logs and log signatures identified from the log signature of the malicious network traffic log may also be stored by database 126.

In various embodiments, service provider server 120 includes at least one network interface component 128 adapted to communicate malicious device 110 over network 140. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including WiFi, microwave, radio frequency (RF), and infrared (IR) communication devices.

Network 140 may be implemented as a single network or a combination of multiple networks. For example, in various embodiments, network 140 may include the Internet or one or more intranets, landline networks, wireless networks, and/or other appropriate types of networks. Thus, network 140 may correspond to small scale communication networks, such as a private or local area network, or a larger scale network, such as a wide area network or the Internet, accessible by the various components of system 100.

FIG. 2 is an exemplary block diagram 200 of a heatmap showing different aggregates calculated for different log fields to generate a log signature of a malicious network traffic log, according to an embodiment. Diagram 200 of FIG. 2 includes a heatmap 1000 generated using a network traffic log associated with a malicious or fraudulent computing action taken with a service provider, such as service provider server 120. In this regard, the service provider may generate heatmap 1000 in diagram 200 as a log signature that allows for identifying patterns in computing attacks and other similar network traffic logs through one or more search functions.

When generating the log signature shown within heatmap 1000, a malicious network traffic log is first identified and accessed, such as when an administrator or developer identifies a computing attack from a source and determined corresponding network traffic logs. In this regard, heatmap 1000 shows different fields 1002 that may be found within the network traffic log, where each field includes different field data, values, or other information. For example, the log signature in diagram 200 includes a user agent string, a source (src), a source (src) port, a method, an account identifier (ID), a status, a uniform resource identifier (uri) path, and destination (dest). However, a network traffic log may have more or less fields and attributes, for example, based on the particular domain, communication channel, and the like. In each of fields 1002, corresponding field data is found, which may be used to compare to the field in other network traffic logs to find other network traffic logs that have the same or similar data in the particular field. Thus, the service provider may further access a set of network traffic logs, such as all or a portion (e.g., taken through sampling) of network traffic logs received over a time period by the same or similar domain for the malicious network traffic log.

For example, the service provider may determine five million network traffic logs received by the service provider during a one-hour period from when the malicious network traffic log was received. When analyzing these other logs, the service provider may analyze each of field 1002 and their corresponding data to determine values for each of variances 1004, spreads 1006, and aggregates 1008. When determining these values for the user agent string field, the data may read: "randomBlobOfText 2.0". When generating the log signature shown in heatmap 1000, the service provider may determine a number of those other network traffic log entries that share this same or similar data within the user agent string field, as well as those IP addresses sending the network traffic logs having the corresponding data within the user agent string field. For example, if network traffic logs are detected from 400 IP addresses, the service provider may determine that only one IP address over the time period is associated with network traffic logs having a user agent string field reading: "randomBlobOfText 2.0". Similarly, if five million network traffic logs exist for the time period, the service provider may determine 250 of the five million network traffic logs are associated with having a user agent string field reading: "randomBlobOfText 2.0".

Thereafter, to determine variances 1004, the number of IP addresses sharing the same or similar data within the particular one of fields 1002 is utilized to determine a value for variances 1004. Variances 1004 may represent or correspond to how much the particular IP address and corresponding data within the one of fields 1002 differs or varies from the other IP addresses. For example, where one other IP address is determined to share "randomBlobOfText 2.0" for their user agent string, then the variance is (400−1)/400, which may be converted to a percent, or 99.75%. This represents the overall uniqueness of the user agent string within network traffic logs over the time period in reading: "randomBlobOfText 2.0". Thus, "randomBlobOfText 2.0" within the user agent string is 99.75% unique or variant from the other IP addresses network traffic logs. This is calculated for each one of fields 1002 shown in heatmap 1000 to generate the corresponding percentages for variances 1004.

To determine spreads 1006, the number of network traffic logs sharing the same or similar data within the particular one of fields 1002 is utilized to determine a value for spreads 1006. Spreads 1006 may represent or correspond to how similar the particular network traffic log's selected field data is to other network traffic log's field data. For example, where 250 thousand network traffic logs share "randomBlobOfText 2.0" for their user agent string, then the spread is 250,000/5,000,000, which may be converted to a percent, or 5.00%. This represents the spread of how common reading: "randomBlobOfText 2.0" is in the user agent string for network traffic logs over the time period. This is calculated for each one of fields 1002 shown in heatmap 1000 to generate the corresponding percentages for spreads 1006.

To generate the log signature shown in heatmap 1000, aggregates 1008 may be determined as a weighted average of the values for each one of fields 1002's variances 1004 and spreads 1006. In some embodiments, the weights of variances 1004 and spreads 1006 may be equal. However, different weights may be assigned to weigh one of variances 1004 and spreads 1006 higher in the overall calculation of aggregates 1008. Aggregates 1008 may therefore consider both the uniqueness and the commonality of network traffic logs reading: "randomBlobOfText 2.0" in their user agent string. In an exemplary embodiment, aggregates 1008 may be calculated as a 70% to 30% ratio of variances 1004 to spreads 1006, respectively. In heatmap 1000, this would be performed as 75%*70%+(100−5)%*30%=98.325%. However, other calculations may also be used and different weights assigned.

Thereafter, the log signature for the malicious network traffic log shown in heatmap 1000 is determined. Further, heatmap 1000 may be arranged in an order of variances 1004, spreads 1006, or aggregates 1008, as well as based on selected ones of field 1002 and/or searching of fields 1002. In some embodiments, this may include ranking and ordering variances 1004, spreads 1006, or aggregates 1008 horizontally in ascending or descending order. If aggregates 1008 are ordered in descending order from largest to smallest, heatmap 1000 may be shown with different search queries, such as search query 1010. In order to find other network traffic logs likely to be originating from the same malicious or fraudulent source as the network traffic log analyzed in diagram 200 and having a log signature corresponding to heatmap 1000, a set of fields 1002 may be used to search for other network traffic logs having the same or similar data within the set of fields 1002 (e.g., having "randomBlobOfText 2.0" in their user agent string). For example, by selecting the top X number of fields 1002 having the highest values for aggregates 1008, a search may be conducted for other network traffic logs that have the same or similar data within these X number of fields 1002. In some embodiments, this may include the top three of fields 1002, such as user agent string, source IP address, and source port. Thus, the data within each of these fields may be utilized as a search to find other network traffic logs sharing the same or similar data within these fields.

However, to identify network traffic logs from different sources that may be associated with the same or similar computing attack, such as using a similar vector or operation to compromise the service provider, the service provider may instead execute a search using the aggregate values and other log signatures. In this regard, search query 1010 may correspond a search executed to find other log signatures having aggregate values for the ones of fields 1002 in search query 1010 over a threshold amount. For example, search query is performed by selecting all of fields 1002 that have values for aggregates 1008 over 65%, which includes user agent string, source IP address, source port, and method. Account ID is not included as it is 61.23%. The service provider may further determine log signatures for other network traffic logs. This may be done for the network traffic logs over the time period or selected for another time period of interest, such as when a computing attack occurred or is actively happening in real-time. Where the number of log entries for network traffic may be too high, sampling may be used to reduce computing resources, such as when streaming network traffic log entries in real-time for log signature determination. Thereafter, when the other log signatures are searched, the service provider may execute a search that requires their corresponding log entries to have values for user agent string, source IP address, source port, and method in their log signatures over 65%. This may then identify other potentially malicious traffic logs and/or malicious sources.

Figure 3:
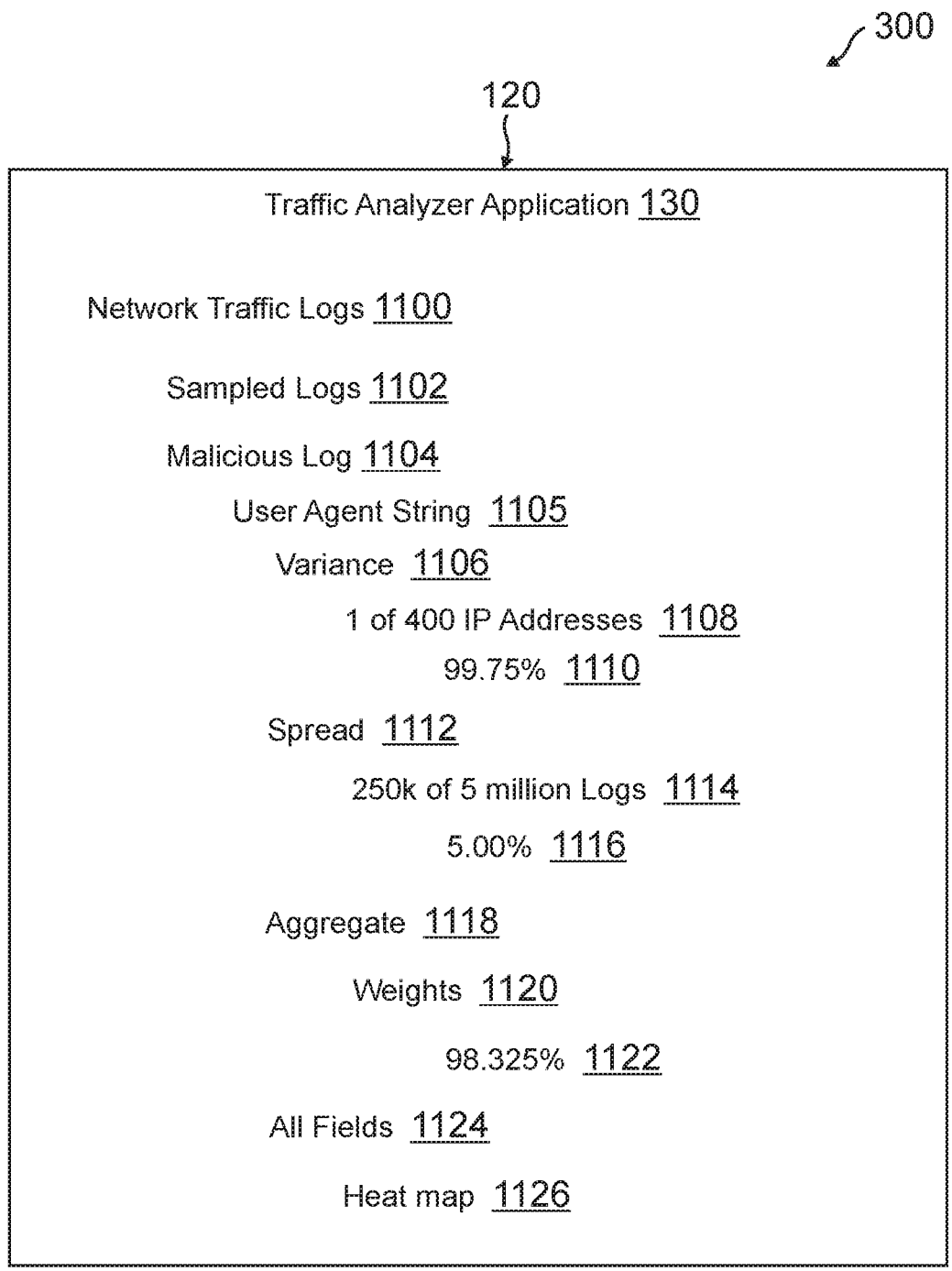
FIG. 3 is an exemplary environment where a service provider server may generate a log signature using a malicious network traffic log, according to an embodiment.

FIG. 3 is an exemplary environment 300 where a service provider server may generate a log signature using a malicious network traffic log, according to an embodiment. Environment 300 includes service provider server 120 executing traffic analyzer application 130 discussed in reference to system 100 of FIG. 1. In this regard, traffic analyzer application 130 may operate within environment 300 to perform determination of log signatures and searching for other network traffic logs that may be potentially malicious and associated with a computing attack.

In environment 300, traffic analyzer application 130 first accesses a set of network traffic logs 1100, which may correspond to log entries for network and/or web traffic received by service provider server 120 over a time period. In some embodiments, this may further correspond to a set of sampled logs 1102, which may be randomly sampled from network traffic logs 1100 in order to provide a reduced set of log entries for determination of log signatures (e.g., to reduce processing load and provide a lighter operation). Within network traffic logs 1100, a malicious log 1104 may be identified, which may correspond to web traffic identified from a computing attack or fraudulent action that compromised service provider server 120 and/or caused a loss. Within malicious log 1104 are different data fields or attributes, with each field corresponding to log data that may be entered in order to further identify and describe the log entry and corresponding network traffic.

For example, malicious log 1104 may include a user agent string 1105 for one of the log fields. In order to determine a log signature for malicious log 1104, a variance 1106 and a spread 1112 are determined, where an aggregate 1118 for user agent string 1105 may then be determined based on weights 1120 applied to variance 1106 and spread 1112. When determining variance 1106, an amount of variance of difference may be calculated based on an IP address difference 1108 for user agent string 1105, shown as 1 of 400 IP addresses that results in a variance value 1110 of 97.75%. When determining spread 1112, an amount of spread or shared data within fields is determined based on a network address spread 1114 for user agent string 1105, shown as 250 k of 5 million logs that results in a spread value 1116 of 5.00%.

Thereafter, aggregate 1118 is determined through applying weights 1120 to variance value 1110 and spread value 1116. Weights 1120 may be adjustable and established to provide a higher value within an aggregate value 1122 to one of variance 1106 and spread 1112. By applying a 70%-30% weight to variance 1106 and spread 1112, respectively, aggregate value 1122 is determined to be 98.325%. This process may occur for all of the fields or attributes of malicious log 1104 when compared to network traffic logs 1100 or sampled logs 1102 (as select by traffic analyzer application 130 for processing requirements). Thereafter, values for all fields 1124 are output, and a heatmap 1126 showing a log signature for malicious log 1104 is provided. This log signature then allows for searching of network traffic logs 1100 and/or sampled logs 1102 to identify similar log entries based on additional log signatures and/or log data within particular log fields of all fields 1124.

Figure 4A:
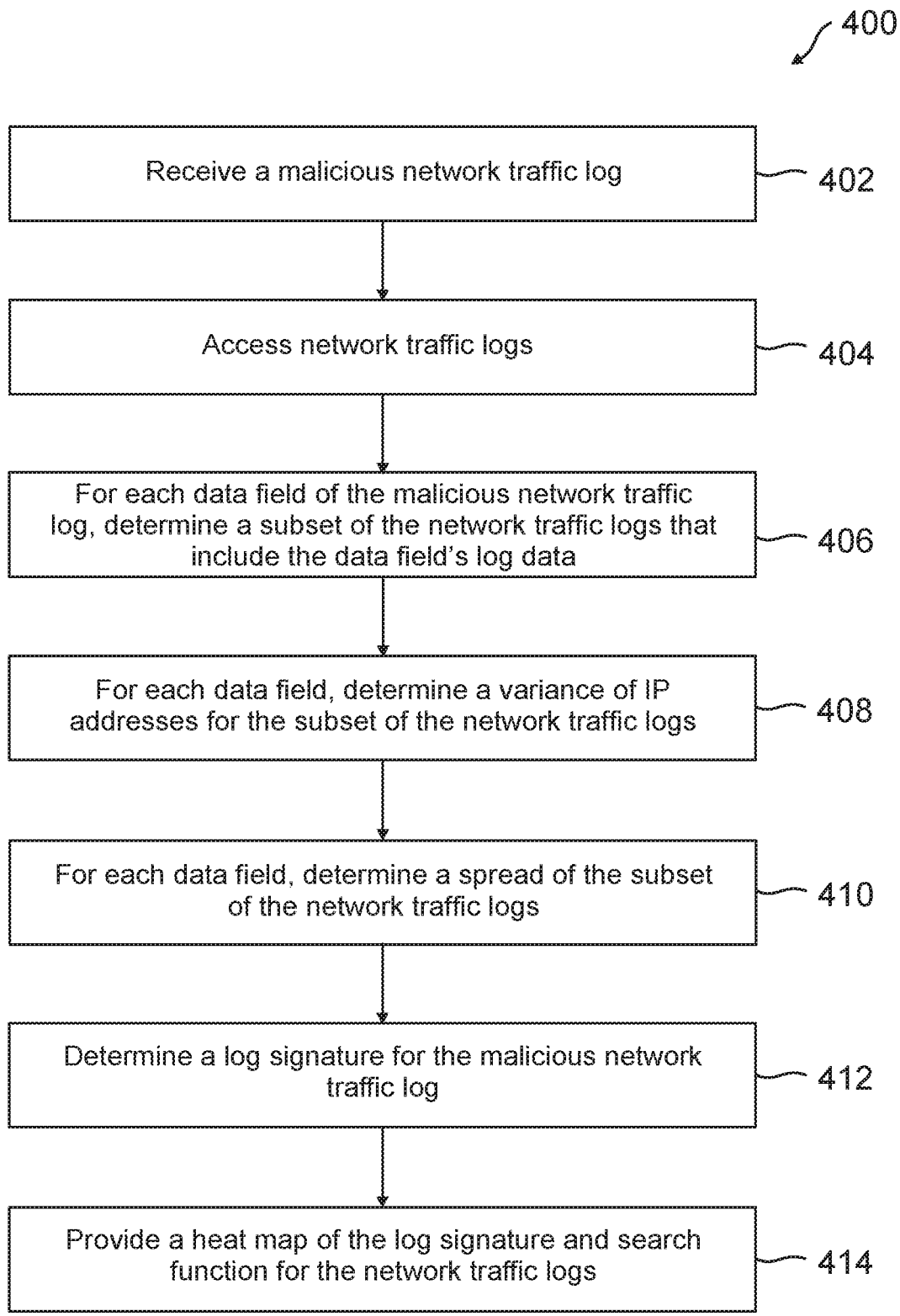
FIG. 4A is a flowchart for identifying patterns in computing attacks through an automated traffic variance finder, according to an embodiment.

FIG. 4A is a flowchart 400 for identifying patterns in computing attacks through an automated traffic variance finder, according to an embodiment. Note that one or more steps, processes, and methods described herein of flowchart 400 may be omitted, performed in a different sequence, or combined as desired or appropriate.

At step 402 of flowchart 400, a malicious network traffic log is received, such as by a service provider or other online platform that may compromised or attacked through malicious or fraudulent computing actions. The malicious network traffic log may be identified as such based on identifying the computing attack, such as when a security team and/or developer identifies past breaches of security or fraudulent actions. Thus, the network traffic log is identified as being malicious by causing some issue with the service provider's systems. Thereafter, in order to generate a signature of the malicious network traffic log, at step 404, network traffic logs are accessed, such as those received by the service provider and/or a domain or communication channel of the service provider over a time period.

Using the malicious network traffic log and the other network traffic logs, at step 406, for each data field of the malicious network traffic log, a subset of the network traffic logs are determined that include the same or similar log data in a particular data field of the malicious network traffic log. For example, the service provider may search the network traffic logs for the time period to determine the subset of the network traffic logs having the same or similar log data in a data field. The service provider may then determine IP addresses that are associated with the subset of the network traffic logs having the same or similar log data within a particular data field, such as a source or source port identifier matching between different log entries. This allows the service provider to determine how many IP addresses are associated with network traffic logs having the same or similar log data in a particular field, as well as how many network traffic logs similarly have the same or similar log data in the particular field.

At step 408, for each data field, a variance of IP addresses for the subset of the network traffic logs is determined. The variance corresponds to how different the IP address for the malicious network traffic log is from other IP addresses of network traffic logs over the time period. This may be determined based on the subset of the network traffic logs and their corresponding IP addresses determined from step 406. Thereafter a ratio or percentage is calculated for the variance based on comparing the IP addresses of the subset to the IP addresses to the totality of the network traffic logs. Similarly, at step 410, a spread of the matching network traffic logs is determined. The spread corresponds to a ratio or percentage of the subset of the network traffic logs compared to the totality of the network traffic logs. This may be determined from the subset of the network traffic logs determined from step 406.

Using the variances and spread for each data field in the malicious network traffic log, at step 412, a log signature for the malicious network traffic log is determined based on aggregates of the variance and spread. This log signature corresponds to weighted averages of the variances and spreads for the log entry such that a score, percentage, or other value is provided for each data field. The log signature therefore allows for sorting and searching the malicious log entry for particular data fields having aggregates over or under a particular value. Furthermore, using the log signature, a heatmap of the log signature and a search function for the network traffic logs are provided at step 414. The search function may allow for identification of other network traffic logs that may be from the same source as the malicious traffic log by having the same or similar log data within the selected data fields such as a set of data fields having the highest aggregate values. Further, the search function allows for identification of similar network traffic logs that may be associated with the same computing attack but from different sources. In order to identify these logs and the different sources, the search function may generate additional log signatures for the other network traffic logs, and search for aggregate values for certain data fields in those additional log signatures over a particular value.

Figure 4B:
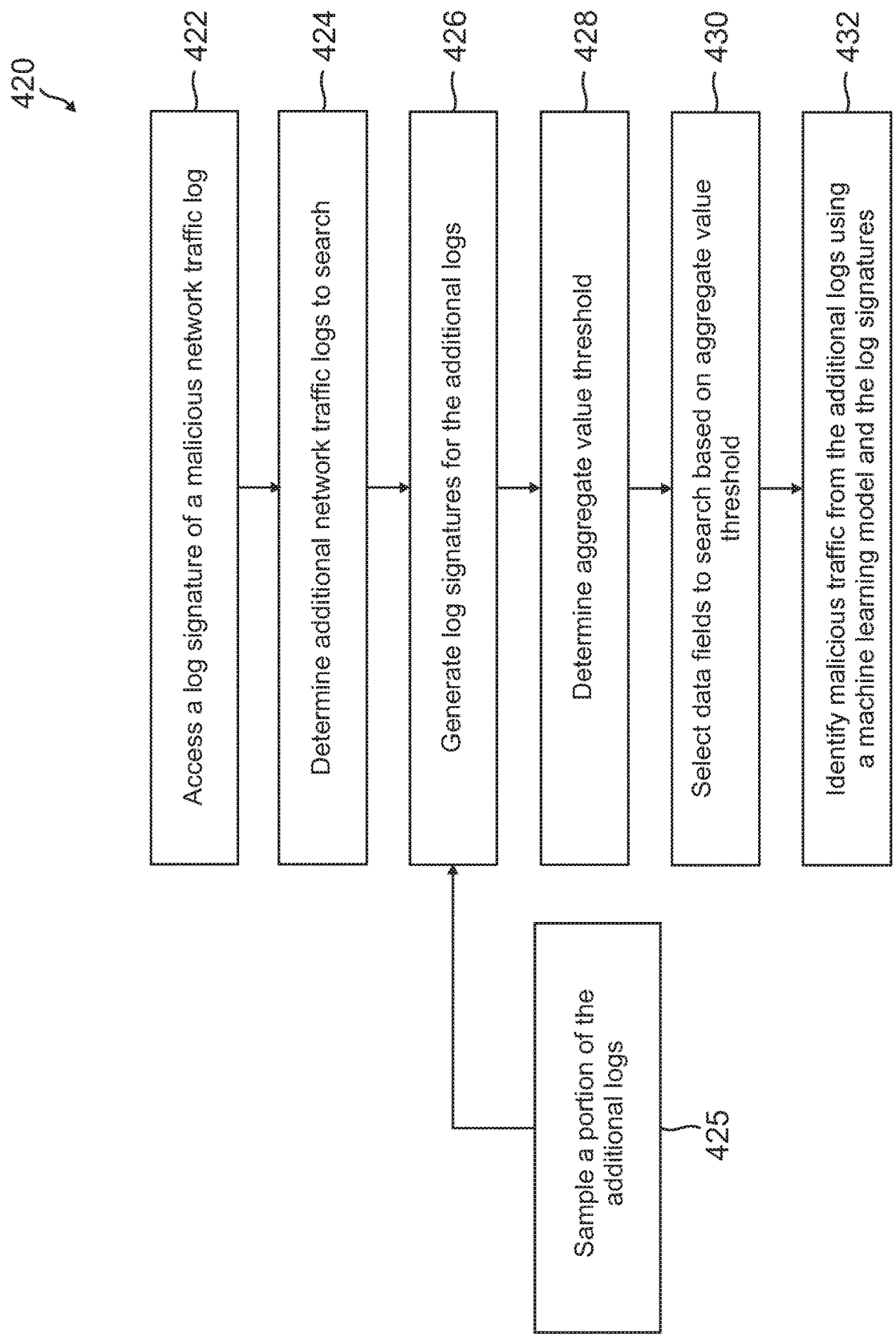
FIG. 4B is a flowchart for searching log signatures to find network traffic logs that are similar to a malicious network traffic log, according to an embodiment.

FIG. 4B is a flowchart 420 for searching log signatures to find network traffic logs that are similar to a malicious network traffic log, according to an embodiment. Note that one or more steps, processes, and methods described herein of flowchart 420 may be omitted, performed in a different sequence, or combined as desired or appropriate.

At step 422 of flowchart 420, a log signature of a malicious network traffic log is accessed, for example, the log signature generated from steps 412 and 414 of flowchart 400 in FIG. 4A. The log signature therefore includes the aggregate values for each data field that has been determined using the variance and the spread for each data field. Thus, the log signature includes a plurality of aggregate values, each one of those aggregate values corresponding to a particular data field of the malicious network traffic log. The service provide then determines additional network traffic logs to search, at step 424. These additional network traffic logs may correspond to past log entries over a time period (e.g., five million log entries received over a one-hour time period). However, in other embodiments, the additional network traffic logs may correspond to real-time or live traffic being received by the service provider, such as when the malicious log signature is used to identify computing attacks in real-time as they occur. In such embodiments, to reduce processing load and stress, at step 425, sampling of the additional logs may be performed to provide a portion of the additional logs, such as 10,000 of one million incoming log entries.

At step 426, log signatures are generated for the additional logs. The log signatures may be generated in the same manner as discussed in FIG. 4A, for example, by calculating variances, spreads, and aggregates for each data field in the additional network traffic logs. Where the analysis of the additional network traffic logs is occurring in real-time for live network traffic, the portion of the additional network traffic logs that was sampled from the incoming traffic may be used for the additional log signature generation. In various embodiments, a machine learning model may also be utilized to generate and determine the log signatures, for example, using aggregate value weights determined by the machine learning model based on training data. For example, the machine learning model may be trained using malicious network traffic logs, where the aggregate values may be determined using different weights and/or attributes trained from the malicious network traffic log. Further, at step 428, the service provider determines an aggregate value threshold, such as a threshold score or percentage for the aggregate values. For example, the service provider may set the aggregate value threshold as 65%, where aggregate values in the malicious log signature are required to be at or above 65% to utilize within a search of the additional log signatures.

Therefore, the service provider analyzes the log signature of the malicious network traffic log using the aggregate value threshold and, at step 430, selects data fields to search based on the aggregate value threshold. In an exemplary embodiment, four data fields may have aggregate values over 65% in the malicious log entry, such as the fields for the user agent string, the source IP address, the source port, and the method. These four data fields may then be selected to search the additional log signatures for similar aggregate values and thus signatures. Thereafter, at step 432, a machine learning model is used with the log signatures to identify other malicious traffic from the additional network traffic logs. For example, a machine learning engine and/or algorithm may train a machine learning model using malicious network traffic logs received by the service provider, as well as log signatures generated from those malicious logs. This may include supervised machine learning where the input malicious logs and/or log signatures are identified as malicious and therefore the input data and output classification is designated. In further embodiments, unsupervised learning may also be used to identify anomalous network traffic logs, and therefore potentially malicious, using a training data set of network traffic logs and/or log signatures.

In various embodiments, the machine learning model may be used to learn from past verified incidents and/or malicious network traffic logs, for example, where a firewall or web logs may be used to train the model(s). Further, if there are new security attacks that may not be caught by the trained model, the malicious network traffic logs from the new attacks may be used to further refine and train the mode. If the machine learning model includes data enrichment and other related log sources, the machine learning model may then find a higher correlation across different source types which might not have previously been linked. To identify patterns in network traffic logs that were not identified in previous processes but include similar patterns, the machine learning model may be used to detect a trend of signatures (e.g., of four selected fields) increasing from 55% to 60% to 65% and to 70% for an aggregate value for a data field in each subsequent time period. Thereafter, the machine learning model would predict 75% for aggregate value for the data field in the next time period. Similarly, the values may follow sinusoidal patterns (55% to 60% to 65% then back to 60%, 55%, and then up again), which may be used to train and identify malicious network traffic logs correspondingly. Conversely, if our signature catches false positives, the machine model may be trained to eliminate future false positives and/or improve the structure of signature. For example, instead of "where aggregate_ua >65% AND aggregate_src >65% AND aggregate_src_port >65% AND aggregate_method >65% AND aggregate_*<=65%", the machine learning model may add additional criteria that the network traffic log should have a specific country of origin. Further, when the data model for machine learning is built, specific data sources may be identified so that when new fields or data sources are added to this data model, the model would be trained to perform additional correlation.

Once the machine learning model is trained, as new traffic is received by the service provider, the machine learning model may be utilized to identify those network traffic logs that are malicious or exhibit malicious behavior. For example, the service provider may receive real-time streaming data of network traffic logs, such as those incoming from a particular domain or system of the service provider. In further embodiments, a designation of a set of past network traffic logs may instead be received as the network traffic logs to analyze. The service provider may generate log signatures, as discussed in flowchart 400 of FIG. 4A, from all or a part of those network traffic logs. The machine learning model may then utilize the trained attributes, weights, and classifiers to determine whether those log signatures are indicative of malicious behavior and/or a computing attack. For example, the machine learning model may analyze the additional network traffic logs to identify those that have aggregate values over a particular threshold that indicates malicious behavior based on the training data from the past malicious network traffic logs. The machine learning model may identify different thresholds for different data field's aggregate values based on the training data, as well as specific data fields and/or number of data fields that are required to exceed their aggregate threshold in order for a traffic log to be identified as malicious. Using these particular weights and attributes for different data fields, the machine learning model may predict which incoming network traffic logs have log signatures indicating malicious behavior.

In some embodiments, a search may be executed of the additional logs using the aggregate value threshold and the selected data fields. For example, the service provider may determine which of the additional log signatures have the log fields from the search query with aggregate values over the aggregate value threshold (e.g., having an aggregate value over 65% for each of the user agent string field, the source IP address field, the source port field, and the method field). An exemplary search query may appear as: "where aggregate user agent string >65% AND aggregate source >65% AND aggregate source port >65% AND aggregate method >65%." This may also include an AND aggregate X<=65% to remove other fields not considered. The additional log signatures that are returned based on this search query may then identify malicious network traffic logs from other sources, such as other sources that utilize the same or similar computing attack.

Figure 5:
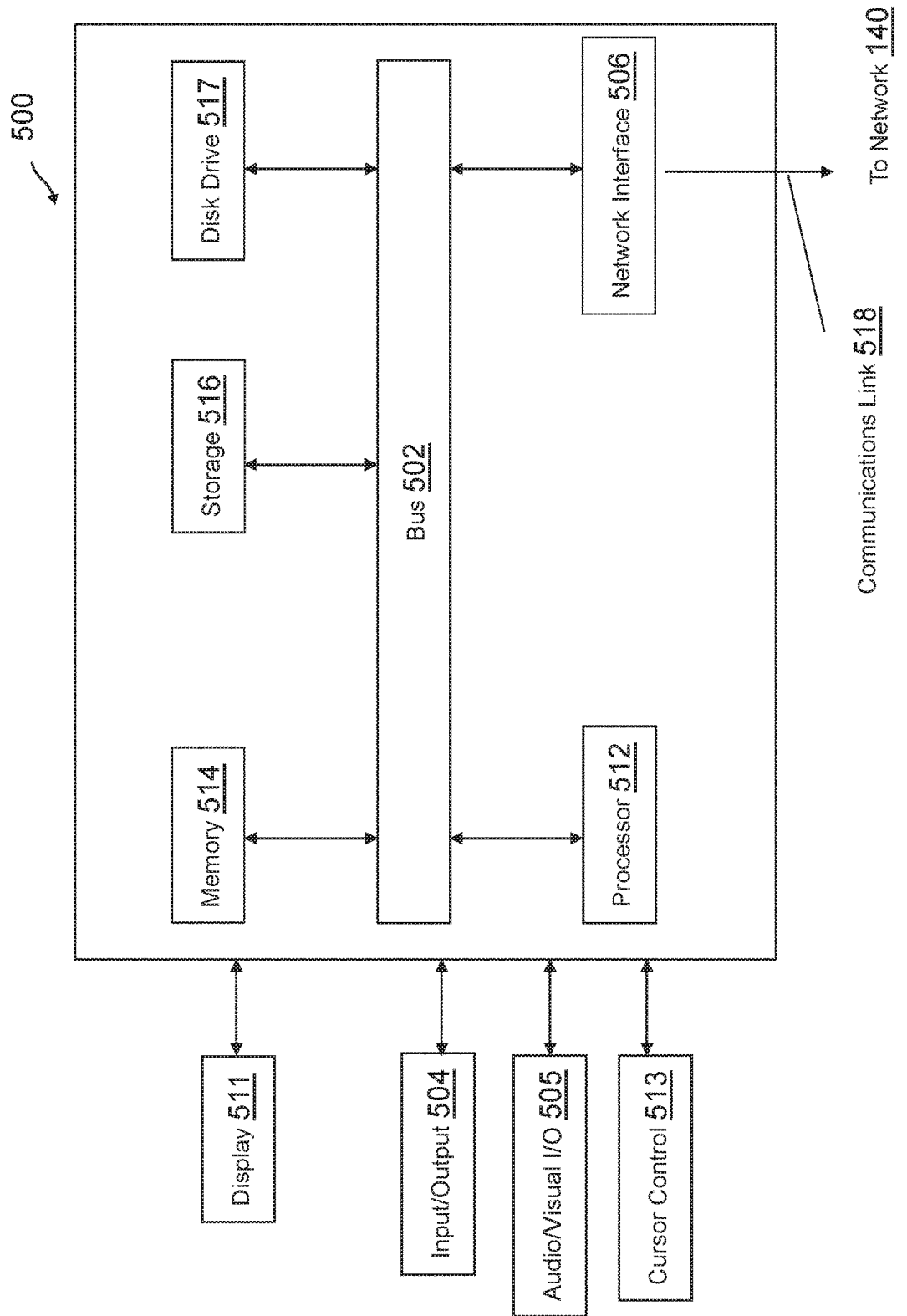
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 140. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
   a non-transitory memory; and
   one or more hardware processors coupled to the non-transitory memory and configured to read instructions from the non-transitory memory to cause the system to perform operations comprising:
   receiving a first network traffic log from a first IP address that is associated with a malicious behavior with an online service provider system, wherein the first network traffic log comprises a plurality of attributes having first log data for the first network traffic log;
   determining a plurality of network traffic logs received by the online service provider system over a time period, wherein the plurality of network traffic logs are from a plurality of IP address and comprise the plurality of attributes;
   determining, for each of the plurality of attributes, variance values of the plurality of IP addresses over the time period that share corresponding log data in the plurality of attributes;
   determining, for each of the plurality of attributes, spread values of the plurality of network traffic logs that share the corresponding log data;
   generating, for each of the plurality of attributes, a first log signature for the first network traffic log based on combined aggregates of the variance values and the spread values;
   training, based on the first log signature and a plurality of additional log signatures, a machine learning model for a malicious log signature classification; and
   determining, using the machine learning model, that a second network traffic log that is associated with the malicious behavior based on determining that a second log signature associated with the second network traffic log corresponds to the first log signature.

2. The system of claim 1, wherein the determining the variance values comprises determining variance percentages in a number of the plurality of IP addresses over the time period that share the corresponding log data.

3. The system of claim 1, wherein the determining the spread values comprises determining spread percentages in a number of the plurality of network traffic logs that share the corresponding log data.

4. The system of claim 1, wherein the generating the first log signature based on the combined aggregates comprises:
applying a first weight to the variance values and a second weight to the spread values; and
determining third percentages for the first log signature based on an average of the weighted variance values and the weighted spread values.

5. The system of claim 1, wherein the determining the second network traffic log comprises:
sampling a subset of the plurality of network traffic logs received through a domain during the time period;
generating additional log signatures for the subset of the plurality of network traffic logs based on additional combined aggregates of additional variance values and additional spread values for the subset of the plurality of network traffic logs; and
determining, using the machine learning model, the second log signature associated with the second network traffic log of the subset of the plurality of the network traffic logs based on the first log signature and the additional log signatures.

6. The system of claim 5, wherein the determining the second log signature comprises:
determining at least four of the plurality of attributes having corresponding combined aggregates for the first log signature over a threshold value;
identifying the second log signature comprising the at least four of the plurality of attributes having the corresponding combined aggregates for the additional log signatures over the threshold value; and
associating the second log signature with a second IP address for the second network traffic log.

7. The system of claim 1, wherein the determining the second network traffic log comprises:
determining at least three of the plurality of attributes having corresponding combined aggregates for the first log signature over a threshold value;
determining the second log signature having the corresponding log data to the first network traffic log in the at least three of the plurality of attributes; and
associating the second log signature with a same source as the first IP address for the first network traffic log.

8. The system of claim 1, wherein the operations further comprise:
outputting a heatmap for the log signature comprising the combined aggregates ranked in an order based on percentage values for the combined aggregates.

9. The system of claim 8, wherein the order comprises a descending order of the percentage values in a grid, and wherein at least one of the combined aggregates is identified in the heatmap based on the percentage values.

10. The system of claim 9, wherein the at least one of the combined aggregates are identified based on a corresponding at least one of the percentage values being over a threshold percentage value.

11. The system of claim 1, wherein the variance values comprise a higher weight in the combined aggregates than a weight of the spread values.

12. The system of claim 1, wherein the malicious behavior comprises one of a fraudulent electronic transaction processing request, a computing attack on the online service provider system, or an unauthorized use of a resource or a computing system of the online service provider system.

13. The system of claim 1, wherein the plurality of attributes are associated with at least one of a device parameter, a network communications parameter, an account identifier, or a device identifier.

14. A method comprising:
accessing a traffic log entry from an IP address that is associated with a computing attack on a service provider, wherein the traffic log entry comprises log fields each having a log value;
determining, for each of the log fields, a variance of the IP address to additional IP addresses based on additional traffic log entries received from the additional IP addresses received over a designated time interval, wherein the variance is further determined based on corresponding log values in the log fields shared between the traffic log entry and the additional traffic log entries;
determining, for each of the log fields, a spread of the traffic log entry to the additional traffic log entries received over the designated time interval based on the corresponding log values;
determining, for each log field, an aggregation based on a weighted average of the variances and the spreads;
determining a plurality of aggregations for at least a portion of the additional traffic log entries; and
searching the at least the portion of the additional traffic log entries based on the aggregation and the plurality of aggregations.

15. The method of claim 14, further comprising:
generating a visual content representation of the aggregations of the log fields for the traffic log entry; and
ranking the aggregations within the visual content representation based on a value of the aggregations in a decreasing order.

16. The method of claim 14, wherein prior to determining the variance of the IP address, the method further comprises:
sampling a portion of traffic log entries received by a domain over the designated time interval; and
determining the at least the portion of the additional traffic log entries based on the sampling.

17. The method of claim 16, further comprising:
executing a search of the traffic log entries using a set of the log fields corresponding to aggregations over a threshold value; and
determining at least one matching traffic log entry based on the search.

18. A non-transitory machine-readable medium having stored thereon machine-readable instructions executable to cause a machine to perform operations comprising:
determining a log signature comprising weighted aggregations based on variance percentages and spread percentages for data fields in a traffic log, wherein the variance percentages and the spread percentages are based on a comparison between log values in the data fields to matching log values in matching data fields for other traffic logs received during a time period;
generating a view of the log signature comprising a heatmap ranking the weighted aggregations in a descending order;
selecting at least one of the weighted aggregations based on the at least one of the weighted aggregations exceeding a threshold value; and
outputting the view of the log signature with the heatmap and a designation of the selected at least one of the weighted aggregations.

19. The non-transitory machine-readable medium of claim 18, wherein the operations further comprise:

providing a search function for at least one additional log signature using the at least one of the weighted aggregations.

20. The non-transitory machine-readable medium of claim 18, wherein prior to the generating the view, the operations further comprise:

enriching the weighted aggregations with additional data fields in an additional log signature from a different domain.

* * * * *